(12) United States Patent
Plocher et al.

(10) Patent No.: US 8,700,405 B2
(45) Date of Patent: Apr. 15, 2014

(54) AUDIO SYSTEM AND METHOD FOR COORDINATING TASKS

(75) Inventors: Tom Plocher, Hugo, MN (US); Emmanuel Letsu-Dake, Plymouth, MN (US); Robert E. De Mers, Nowthen, MN (US); Paul Derby, Lubbock, TX (US)

(73) Assignee: Honeywell International Inc, Morristown, NJ (US)

( * ) Notice: Subject to any disclaimer, the term of this patent is extended or adjusted under 35 U.S.C. 154(b) by 1095 days.

(21) Appl. No.: 12/658,917

(22) Filed: Feb. 16, 2010

(65) Prior Publication Data

US 2011/0202351 A1 Aug. 18, 2011

(51) Int. Cl.
*G10L 15/00* (2013.01)

(52) U.S. Cl.
USPC ............................ 704/260; 704/275; 709/244

(58) Field of Classification Search
USPC ................................ 704/260, 275; 709/244
See application file for complete search history.

(56) References Cited

U.S. PATENT DOCUMENTS

| | | | |
|---|---|---|---|
| 5,619,655 A * | 4/1997 | Weng et al. | 709/226 |
| 5,752,232 A * | 5/1998 | Basore et al. | 704/275 |
| 5,926,790 A | 7/1999 | Wright | |
| 5,950,167 A * | 9/1999 | Yaker | 704/275 |
| 6,064,323 A | 5/2000 | Ishii et al. | |
| 6,128,594 A | 10/2000 | Gulli et al. | |
| 6,173,192 B1 | 1/2001 | Clark | |
| 6,298,324 B1 | 10/2001 | Zuberec et al. | |
| 6,480,765 B2 | 11/2002 | Gardner | |
| 6,574,672 B1 * | 6/2003 | Mitchell et al. | 709/250 |
| 6,598,018 B1 | 7/2003 | Junqua | |
| 6,708,150 B1 | 3/2004 | Hirayama et al. | |
| 6,720,890 B1 | 4/2004 | Ezroni et al. | |
| 6,778,963 B2 | 8/2004 | Yamamoto et al. | |
| 6,803,860 B1 | 10/2004 | Langner et al. | |
| 6,839,670 B1 | 1/2005 | Stammler et al. | |
| 6,859,773 B2 | 2/2005 | Breton | |
| 6,968,311 B2 | 11/2005 | Knockeart et al. | |
| 7,010,427 B2 | 3/2006 | Ebi | |
| 7,089,108 B2 | 8/2006 | Merritt | |
| 7,113,857 B2 | 9/2006 | Ilan et al. | |
| 7,240,008 B2 | 7/2007 | Hitotsumatsu | |
| 7,254,545 B2 | 8/2007 | Falcon et al. | |
| 7,277,846 B2 | 10/2007 | Satoh | |
| 7,289,890 B2 | 10/2007 | Mitchell et al. | |
| 7,349,851 B2 | 3/2008 | Zuberec et al. | |
| 7,363,229 B2 | 4/2008 | Falcon et al. | |
| 7,415,326 B2 | 8/2008 | Komer et al. | |
| 7,516,077 B2 | 4/2009 | Yokoi et al. | |

(Continued)

FOREIGN PATENT DOCUMENTS

EP 1233407 A1 8/2002
EP 1832850 A1 9/2007

(Continued)

*Primary Examiner* — Daniel D Abebe

(74) *Attorney, Agent, or Firm* — Schwegman, Lundberg & Woessner, P.A.

(57) ABSTRACT

A system includes a hands free mobile communication device. Software stored on a machine readable storage device is executed to cause the hands free mobile communication device to communicate audibly with a field operator performing field operations. The operator receives instructions regarding operations to be performed. Oral communications are received from the operator and are processed automatically to provide further instructions in response to the received oral communications.

16 Claims, 9 Drawing Sheets

(56) References Cited

U.S. PATENT DOCUMENTS

| | | |
|---|---|---|
| 7,525,448 B1 | 4/2009 | Wilson et al. |
| 7,548,861 B2 | 6/2009 | Nada |
| 7,568,662 B1 | 8/2009 | Conner |
| 7,580,377 B2 | 8/2009 | Judd |
| 7,606,715 B1 | 10/2009 | Krenz |
| 2002/0107694 A1 | 8/2002 | Lerg |
| 2002/0143553 A1 | 10/2002 | Migdol et al. |
| 2004/0107097 A1 | 6/2004 | Lenane et al. |
| 2004/0124998 A1 | 7/2004 | Dame |
| 2004/0267534 A1 | 12/2004 | Beiermeister et al. |
| 2005/0091036 A1 | 4/2005 | Shackleton et al. |
| 2007/0033043 A1 | 2/2007 | Hyakumoto |
| 2007/0038461 A1 | 2/2007 | Abbott et al. |
| 2007/0083300 A1 | 4/2007 | Mukheriee |
| 2007/0136069 A1 | 6/2007 | Veliu et al. |
| 2007/0215745 A1 | 9/2007 | Fleury et al. |
| 2007/0219805 A1 | 9/2007 | Nomura |
| 2007/0265849 A1 | 11/2007 | Grost et al. |
| 2007/0288242 A1 | 12/2007 | Spengler et al. |
| 2008/0004875 A1 | 1/2008 | Chengalvarayan |
| 2008/0010057 A1 | 1/2008 | Chengalvarayan et al. |
| 2008/0037727 A1 | 2/2008 | Sivertsen et al. |
| 2008/0039988 A1 | 2/2008 | Estabrook et al. |
| 2008/0046250 A1 | 2/2008 | Agapi et al. |
| 2008/0048908 A1 | 2/2008 | Sato |
| 2008/0065275 A1 | 3/2008 | Vizzini |
| 2008/0077404 A1 | 3/2008 | Akamine et al. |
| 2008/0083851 A1 | 4/2008 | Perry et al. |
| 2008/0103781 A1 | 5/2008 | Wasson et al. |
| 2008/0114504 A1 | 5/2008 | Goodman et al. |
| 2008/0114598 A1 | 5/2008 | Prieto et al. |
| 2008/0114603 A1 | 5/2008 | Desrochers |
| 2008/0140306 A1 | 6/2008 | Snodgrass et al. |
| 2008/0144638 A1 | 6/2008 | Bay et al. |
| 2008/0201148 A1 | 8/2008 | Desrochers |
| 2008/0255843 A1 | 10/2008 | Sun et al. |
| 2009/0012785 A1 | 1/2009 | Chengalvarayan |
| 2009/0018840 A1 | 1/2009 | Lutz et al. |
| 2009/0018842 A1 | 1/2009 | Caire et al. |
| 2009/0055180 A1 | 2/2009 | Coon et al. |
| 2009/0083034 A1 | 3/2009 | Hernandez et al. |
| 2009/0164216 A1 | 6/2009 | Chengalvarayan et al. |
| 2009/0182559 A1 | 7/2009 | Gerl et al. |
| 2009/0182562 A1 | 7/2009 | Caire et al. |
| 2009/0187406 A1 | 7/2009 | Sakuma et al. |

FOREIGN PATENT DOCUMENTS

| | | |
|---|---|---|
| EP | 1906539 A2 | 4/2008 |
| EP | 2040250 A1 | 3/2009 |
| WO | WO-0235518 A1 | 5/2002 |
| WO | WO-2006082764 A1 | 8/2006 |

* cited by examiner

| | CONSOLE OPERATOR | FIELD OPERATOR | OBSERVED RESULT | NOTES |
|---|---|---|---|---|
| 7. | A CONTROL TRANSFER BEEP AT THE END OF THIS STEP INDICATES COMPLETION OF THE STEP BY FO AND TRANSFER OF CONTROL TO FCO | VERIFY FROM ITS INDICATOR THAT THE FLUE GAS BYPASS VALVE PV-31380/PV-31394/PV-33544 IS OPEN | | |
| 8. | VERIFY THAT THE FLUE GAS BYPASS VALVE PV-31380/PV-31394/PV-33544 IS CONTROLLING THE FIRE BOX PRESSURE | | | |
| 9. | NOTIFY THE UPSTEAM AND DOWNSTREAM UNITS OF THE CURRENT CONDITION OF THE COKER UNIT, CHANGES IN FEED DIET, AND PRODUCT MAKE:<br>OP-2 REDUCTION IN DRY GAS MAKE 6-1069<br>ARU REDUCTION IN SULFUR LOAD 6-6885<br>CCU REDUCTION OF HGO FEED 6-6233<br>AKLY C4's 6-6171<br>DU-2 CHANGES IN NAPTHA 6-6630 | | | |
| 10. | | ON THE HEATER, CLOSE THE INLET BLOCK VALVES TO THE FEED CONTROL VALVES | | |
| 11. | | ON THE HEATER, CLOSE THE INLET BLOCK VALVES TO THE MAIN FUEL GAS VALVE | | |
| 12. | | OPEN THE STEAM PURGE BYPASS DOWNSTREAM OF THE SP-6 VALVE | | |
| 13A. | ALLOW STEAM PURGE BYPASS DOWNSTREAM OF THE SP-6 VALVE AND PASSES TO STEAMED FOR 30 MINUTES | | | TO MAINTAIN FORWARD STEAM FLOW IN THE DRUM AND PREVENT THE CHANNELS FROM COLLAPSING WHEN THE INJECTION STEAM TO THE PASSES IS BLOCKED |
| 13B. | START SNUFFING STEAM INTO THE FIREBOX. CLOSE THE INJECTION STEAM TO 4 PASSES OF THE AFFECTED HEATER | | | LEAVE THE SNUFFING STEAM IN THE FIREBOX UNTIL INSTRUCTED BY SUPERVISOR |

*FIG. 8B*

| # | CONSOLE OPERATOR | FIELD OPERATOR | OBSERVED RESULT | NOTES |
|---|---|---|---|---|
| 14. | | VERIFY THAT THE 5 VALVE IS CLOSED | | IN ORDER TO CLOSE THE 6 VALVE, THE SWITCH VALVE HAS TO BE LINED UP TO BYPASS. THE 5 VALVE MUST REMAINED CLOSED TO PREVENT THE FRACT VAPOR FROM BACKING THROUGH THE BYPASS LINE AND OUT THE RUPTURE IN THE FURNACE TUBE. ONCE THE SWITCH VALVE IS PLACED IN THE BY PASS |
| 15. | | PULL THE PINS AND SWING THE SWITCH VALVE TO THE BYPASS POSITION | | AS SOON AS THE CONSOLE OPERATOR HAS THE STEAM VALVES TO EACH PASS CLOSED |
| 16. | | BLOCK THE APPROPRIATE SP-6 (A-F) VALVE TO THE PARTIALLY FILLED COKE DRUMS | | |
| 17. | | START STEAM STRIPPING THE DRUM | | |
| 18. | | VERIFY THAT THE VENT GAS FROM THE C4 TREATER IS LINED UP TO THE FLARE | | NORMAL LINEUP IS TO FLARE. C4 TREATER VENT GAS DOES NOT GO TO H-31003 |
| 19. | | LINE UP THE VENT GAS FROM THE C4 TREATER TO THE FLARE AND BLOCK IT TO THE HEATER | | |
| 20. | MAXIMIZE FEED RATES TO HEATER THAT IS STILL ON LINE | | | |
| 21. | | CLOSE THE STEAM VALVE TO THE STEAM SUPERHEATER COIL AND BLOCK IN THE OUTLET | | ONCE THE HEATER IS SECURED AND ACCESSIBLE |
| 22. | | VENT THE COIL TO THE ATMOSPHERE | | |

FIG. 8C

AUDIO SYSTEM AND METHOD FOR COORDINATING TASKS

BACKGROUND

Handheld devices have been used to support industrial field operations and maintenance. Such devices have suffered from the use of small user interfaces, including small format touchscreens and keypads. It is difficult for users to interact with these devices to enter data via a touch input. The text is small and difficult to read. Bright outdoor light further obscures the text. Further, while performing operations that require the use of both hands, the device must be continually stowed and retrieved. Since some operations are performed on ladders or platforms and sometimes in inclement weather, the interaction with the device may be very frustrating and distract the user from performing field operations.

SUMMARY

A system includes one or more hands free mobile communication devices. Software stored on a machine readable storage device is executed to cause the hands free mobile communication devices to communicate audibly with field operators performing field operations. The operators are instructed regarding operations to be performed. Oral communications are received from the operators, interpreted by the system and routed appropriately. The interpreted communications may automatically trigger further instructions.

Oral communications may include comments from the operator. The system in one embodiment may route or otherwise process the comments as a function of the context in which the comments are generated and the content of the comment.

In some embodiments, the system supports the synchronous execution of procedures by multiple operators and by multiple operators in coordination with an automated control system.

BRIEF DESCRIPTION OF THE DRAWINGS

FIGS. 8A, 8B, and 8C taken together illustrate a chart describing interaction of a console operator and a field operator interacting with a procedure according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software on a storage device, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
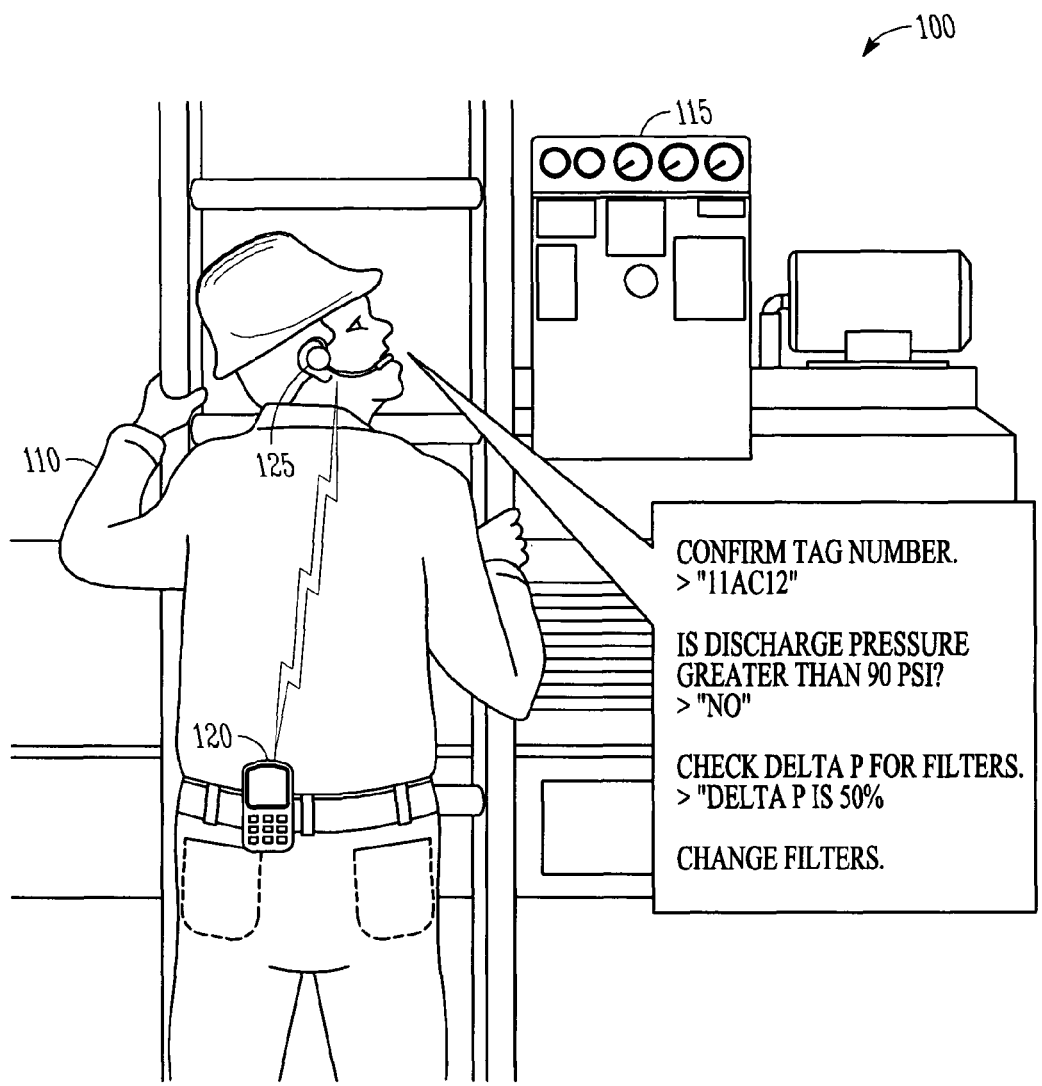
FIG. 1 is a portrayal of a field operator in an industrial plant performing a task in a procedure utilizing a hands free communication device according to an example embodiment.

FIG. 1 is a portrayal 100 of a field operator 110 in an industrial plant 115, such as a refinery, performing a task in a procedure for handling operations and maintenance of the industrial plant. In one embodiment, the field operator 110 is on a ladder, and is using a hands free mobile communication device 120, such as a cellular phone or integrated data and voice communications device along with a wireless headset 125 to interact with a system to jointly execute the procedure. A procedure may be thought of as a set of explicit actions or steps and instructions that are followed by operational personnel alone or in close coordination with an automated control system and optionally multiple personnel in a coordinated manner to execute a process or achieve a goal. While an industrial plant is used as an example, the invention may also be adapted to operations and maintenance of space vehicles, maintenance and servicing of commercial aircraft on the ground, and in security and HVAC servicing and operations in buildings.

The procedure may be written in a machine executable program that is stored on a storage device, and provides speech based instructions to the operator. The system generates the speech based instructions, and receives oral data and commands from the field operator 110 as shown in a dialog box 130. The speech generated instructions from the system are provided to the operator. The first instruction in this example dialog 130 is "Confirm Tag number." The operator responds orally with "11AC12". The system interprets the oral response and acts in accordance with the procedure, such as perhaps checking the tag number for accuracy and then provides a question for the operator to answer: "Is discharge pressure greater than 90 psi?" The operator responds with "No". This response is also interpreted and may affect the flow of the procedure. Given the response of "No", the next instruction is "Check delta P for filters." The operator responds "Delta P is 50%". An instruction may then be provided to "Change filters". The field operator in this example was able to stay on the ladder, and complete a procedure without having to physically interact with the device.

Many different procedures may be facilitated by the system, such as structured tasks, maintenance rounds, procedural operations such as unit start ups and shut downs, product installations and servicing. The system is fully speech interactive and wireless using a body worn mobile device.

Figure 2:
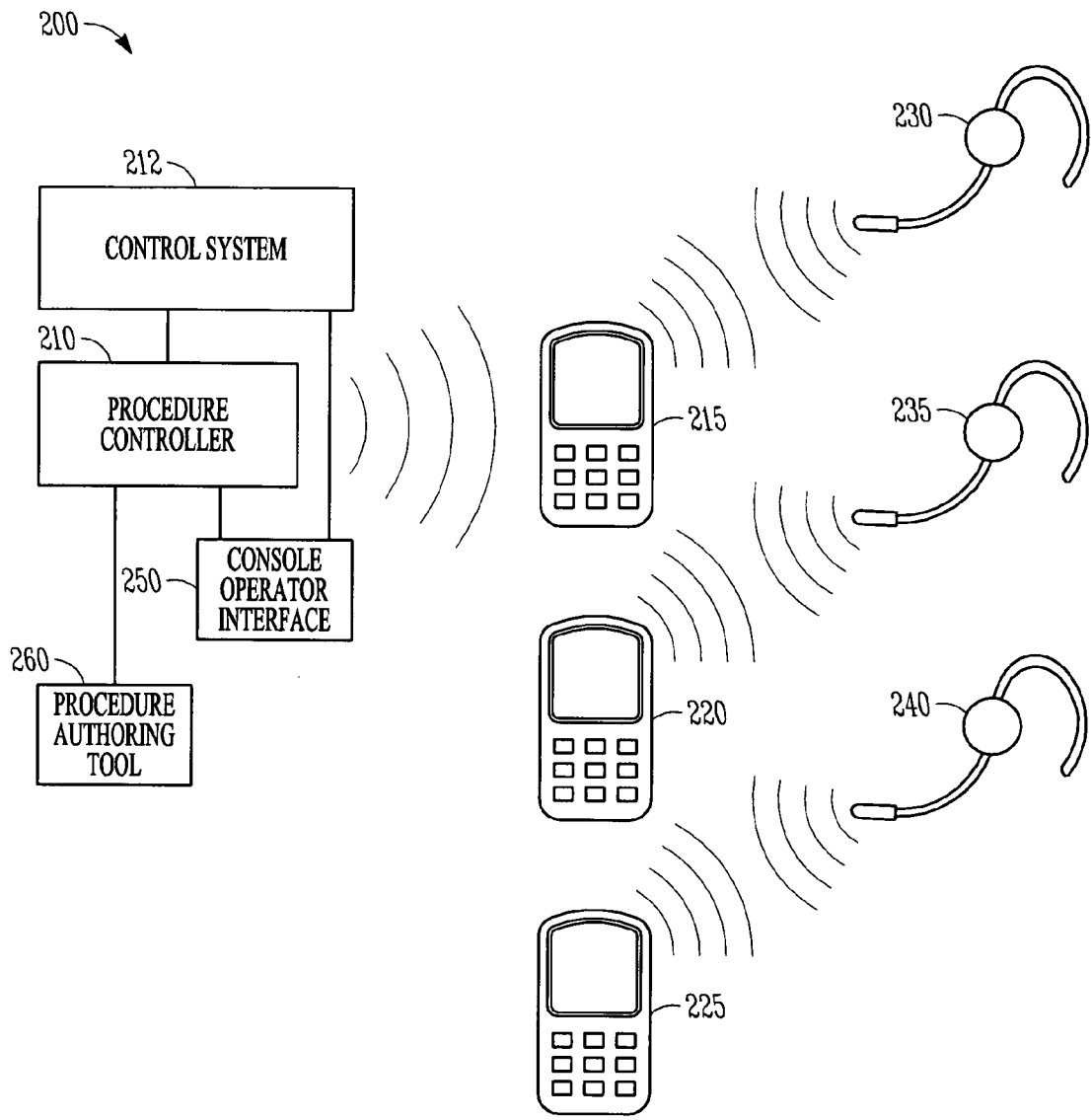
FIG. 2 is a block diagram of a controller interacting with multiple hands free mobile communication devices and a console operator interface according to an example embodiment.

In one embodiment, as shown in block diagram 200 in FIG. 2, the instructions describing one or more procedures may be stored and executed on a controller 210, which may be referred to as a procedure controller. The controller 210 may be a stand alone device, or coupled to or part of a process controller, such as a distributed process controller 212 that controls operations in a plant. Further, the instructions may be stored on one or more handheld devices that allow hands free communication with a field operator.

Controller 210 in one embodiment communicates with multiple operators via devices 215, 220 and 225. Each device may be a wireless mobile communications platform with a wireless or wired headset having a speaker and microphone device indicated at 230, 235 and 240 respectively to provide a hands free mobile communication device. In further embodiments, noise cancellation features may be included, as many industrial plants like refineries can have a high level of ambient noise that would otherwise interfere with communications. In still further embodiments, the mobile communications platform may be integrated with the headset.

In further embodiments, controller 210 may have a console operator interface 250 coupled to it via a wired or wireless network. Console operator interface 250 may be a common workstation in one embodiment, having a display, keyboard, and a data entry device (e.g., mouse, touchpad, etc.), and is also coupled to the distributed control system 212. Still further, operator interface 250 may include voice capabilities for communicating directly with operators and the control device in a manner similar to that provided by the mobile communication devices 215, 220, and 225. Operator interface 250 may also be used as part of the execution of a procedure program being executed by controller 210. For instance, the operator interface 250 may be used to allow an operator to interact directly with a control system to cause actions to occur in the plant that are relevant to tasks being performed by one or more field operators. In one simple example, a valve may need to be closed using the controller 210 prior to the field operator performing a measurement or other action.

In one embodiment, controller 210 may execute a procedure that includes instructions for causing the hands free mobile communication device to communicate audibly with a field operator performing field operations. The mobile communication device may instruct the operator regarding operations to be performed, receive oral communications from the operator, and to interpret/process the received oral communications by means of speech recognition and provide further instructions responsive to the received oral communications.

In some procedures, multiple field operators may be helping to perform the procedure. The activities of the operators may need to be synchronized. One operator may need to complete a task prior to another operator starting a succeeding task. Some tasks may be performed in parallel by two or more operators. Operators may need to perform tasks in synchrony with tasks performed by the automatic process control system. In this case, an operator may have to wait for the control system to perform an action, such as ramping up temperature or pressure in a vessel to a prescribed level, before he or she opens a valve, introduces another chemical to the process, etc. A procedure authoring tool 260, such as one called PRIDE, may be used to generate procedures in a high level language, such as an XML script, for execution. The procedure authoring tool allows the programming of if-then scenarios, as illustrated above, where the field operator was instructed to replace a filter when a difference in pressure read in the field exceeded a certain threshold. The XML script, or other type of machine executable language, may also control timing of tasks, recognition of responses, and allow for comments.

In one embodiment, the script identifies text to read to a field operator, either by text to speech conversion, or by a pre-recorded audio file (e.g., way, etc.). The script then causes a machine executing it to perform speech recognition on audible information and commands received from the operator. Oral communications are recognized and converted to text commands. The format of the script in one example embodiment may take the form of {Instr.;Response;Comment}. The following is a word list corresponding to commands for hands free interaction for one example form that the procedure language may take in one example embodiment:

```
# word list file, put each voice command on a separate line
# anything after a '#' symbol is ignored by parser
Ok
Cancel
Phonetic Numbers #Unlimited Digits 0-9
Save and Exit
On
Off
Phonetic Alphabets #Unlimited Letters inc "space"
Clear
Next
Previous
Edit
Clear Text
Check Box
Skip Check
Previous Settings
User Settings
Status Page
Reset Values
All
Auto
Manual
All Data
Message
Comment One
Done
Invalid
Pause
Comment
Resume
```

Figure 3:
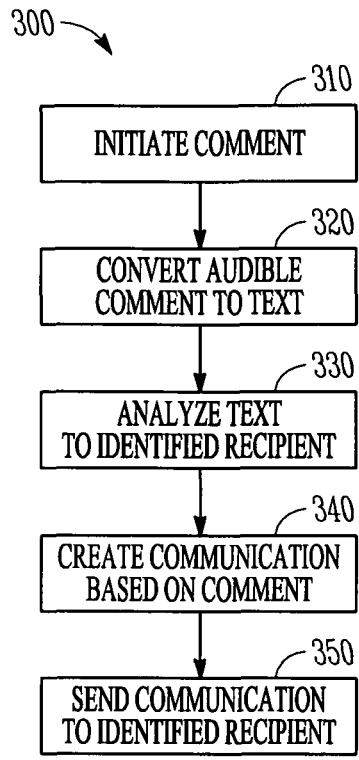
FIG. 3 is a flowchart illustrating a method of handling comments according to an example embodiment.

In one embodiment, one of the text commands causes recording of audible comments provided by the field operator as illustrated in a flowchart 300 in FIG. 3. The text commands for handling comments may include Comment, done, invalid, pause, and resume as indicated above or other commands necessary to control the recording of comments or notes. Such commands may be operable to initiate a comment at 310 and while audible comments are being recorded. At 320, the audible comment is converted to text, and at 330, the comment text is analyzed to identify or infer automatically a recipient of an electronic communication to which the comment will be sent. In further embodiments, the comment may simply be recorded in a comment log.

Keywords in the comment may be identified in the text and compared to known keywords to identify the recipient and to create the communication based on the comment as indicated at 340. The communication in one embodiment may include a context in which the comment is entered. In one example, the word "broken" or "needs repair" may result in a work order being prepared as part of the communication. From the context of the task, such as "inspect pipe", the work order may be routed to a person or department that is responsible for fixing pipes. There are many other examples that are easy to generate given a list of potential repairs, or other actions that would be known to result from a specific procedure. In some embodiment, the context includes a name of a procedure being performed by the field operator at the time the comment is provided.

Figure 4:
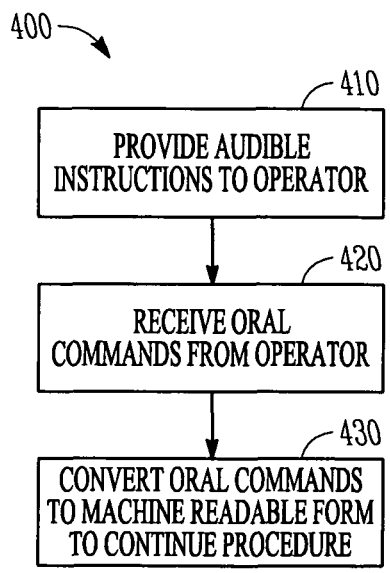
FIG. 4 is a flowchart illustrating handling of audible instructions from a field operator according to an example embodiment.

FIG. 4 is a flowchart illustrating a method 400 that includes providing audible instructions to a field operator via a hands free communication device in accordance with a procedure written in a machine readable form at 410. Oral commands may be received from the hands free mobile communication device at 420 as an operator performs the procedure in accordance with the audible instructions. At 430, the oral commands are converted to machine readable form to continue executing the procedure interactively via the hands free communication device.

In one embodiment, the procedure may synchronize instructions and commands via multiple hands free communication devices such that multiple operators are instructed to perform tasks in the procedure in a synchronized manner. Furthermore, multiple operators may be instructed to perform tasks in synchrony with tasks performed by the automated process control system. Some tasks may be performed in parallel and other tasks are performed only after receiving oral commands indicating that a predetermined task is completed. The tasks may be assigned to specific field operators.

Figure 5:
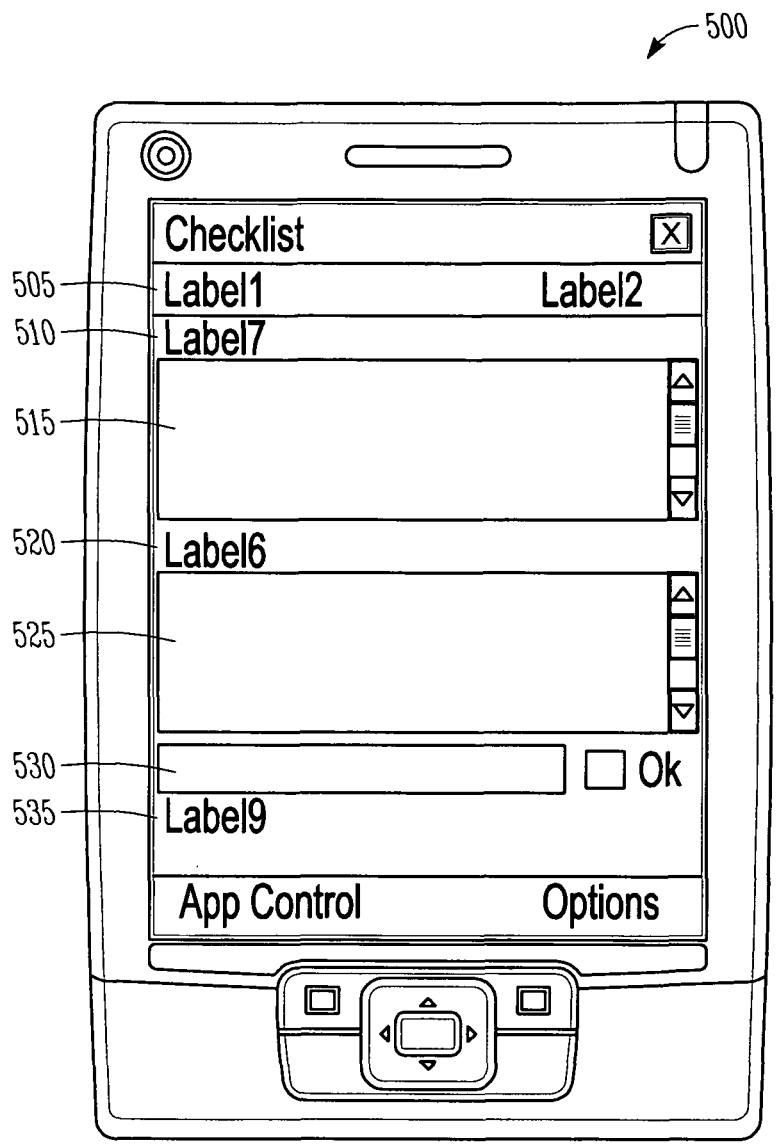
FIG. 5 is a drawing of a field operator interface for a hands free mobile communication device according to an example embodiment.
Figure 6:
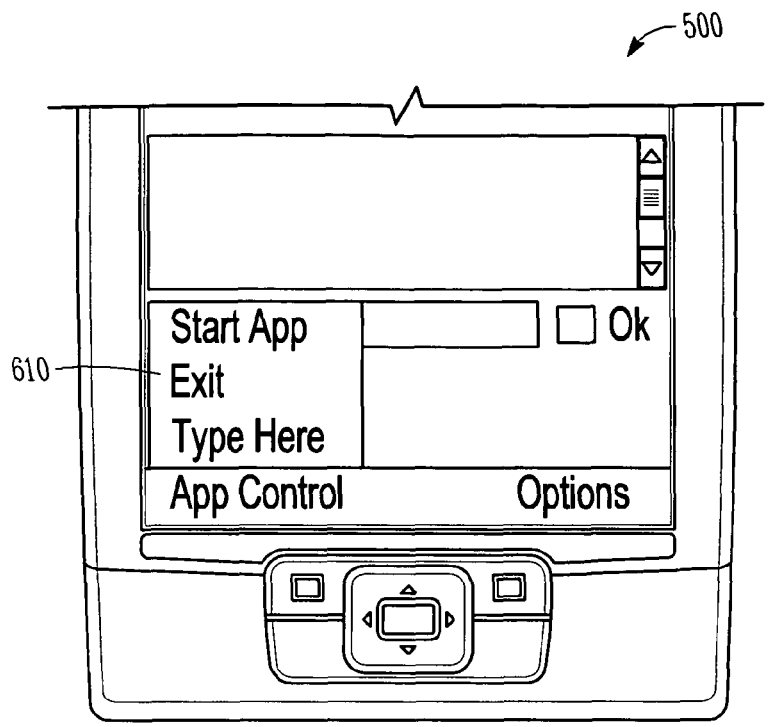
FIG. 6 is a drawing a portion of a field operator interface for a hands free mobile communication device according to an example embodiment.
Figure 7:
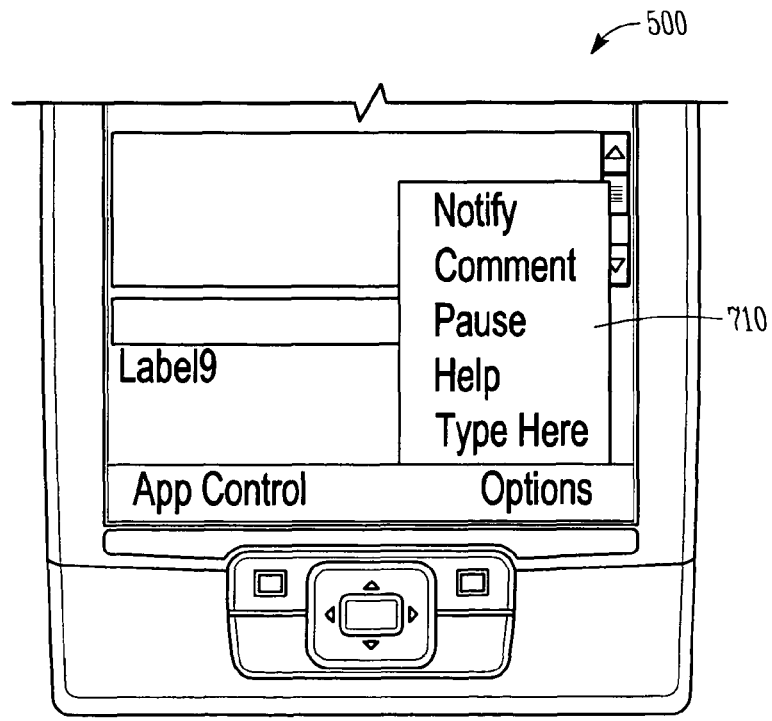
FIG. 7 is a drawing of a portion of a field operator interface for a hands free mobile communication device according to an example embodiment.

In further embodiments, a handheld mobile communication device may include a graphical user interface, one instance of which is illustrated at 500 in FIG. 5. The graphical user interface 500 may include items such as step title 505, previous step 510, previous instruction 515, current step 520, current instruction 525, response 530 and status, such as pause, comment, etc., at 535. Further menus may be accessed via an App Control button 540 and an Options button 545. Such menus are illustrated at 610 in FIG. 6, and 710 in FIG. 7 respectively.

The user interface 500 may be used to help a field operator keep track of where they are in a procedure in case the operator becomes distracted during performance of the procedure. It may also be used to enter data via a touchscreen interface or other interface other than audio if desired. The graphical user interface, touchscreen interface, or other interface works in synchrony with the speech-based interface so that the user can move seamlessly back and forth between interaction modalities. In some embodiments, speech recognition may be performed at the mobile communication device or the controller 210.

Figure 8A:
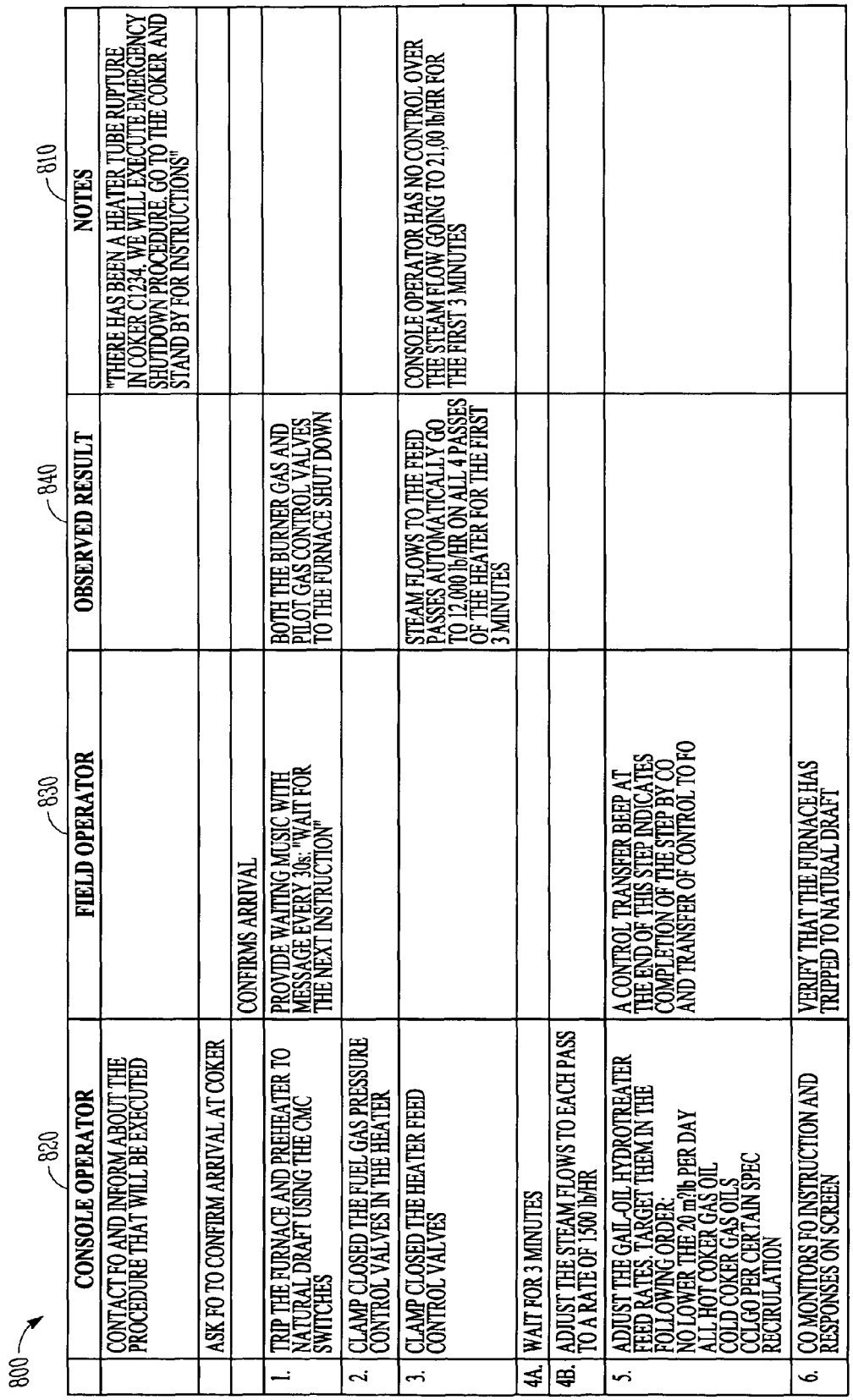

FIGS. 8A, 8B, and 8C together form a chart 800 illustrating the interaction of a console operator with a field operator, facilitated by the use of a hands free mobile communication device using the system and method of performing procedures described above. In this example, a procedure has been initiated to handle a coker heater tube rupture in Coker C1234 as indicated in a notes column 810. A console operator column 820 provides instructions on a screen, in audio, or both to a console operator, usually residing in a control room. Completion for the console operator may be by button or audio if desired. Operator instructions and interactions are detailed in column 830, with an observed result indicated in column 840.

The console operator is first instructed to contact the field operator to inform him or her about the procedure that will be executed, and asks the field operator to confirm arrival at the Coker. The field operator confirms arrival and may be provided with an indication to wait for the next instruction. Waiting music may be provided, or further information regarding the procedure to be performed may be provided in various embodiment. The console operator then performs several operations responsive to instructions provided by execution of the procedure. Steps in chart 800 are numbered in the left most column. Once parameters reach a predetermined level as indicated in step 5a., a beep or other communication may be provided to the field operator to get ready to perform a task. The first task for the field operator is identified in an audible instruction to verify that a furnace has tripped to natural draft. The operator may reply with a confirmatory command, such as "OK", or "Verified".

As can be seen in this procedure, operations by the console operator and field operator transfer back and forth. In step 9, another operator may be asked to perform a task, followed by further instructions for the field operator in column 830. In a mixed manual-automated procedure, the automated control system may perform tasks as well, exchanging initiative as dictated by the procedure with the field and console operators.

Figure 9:
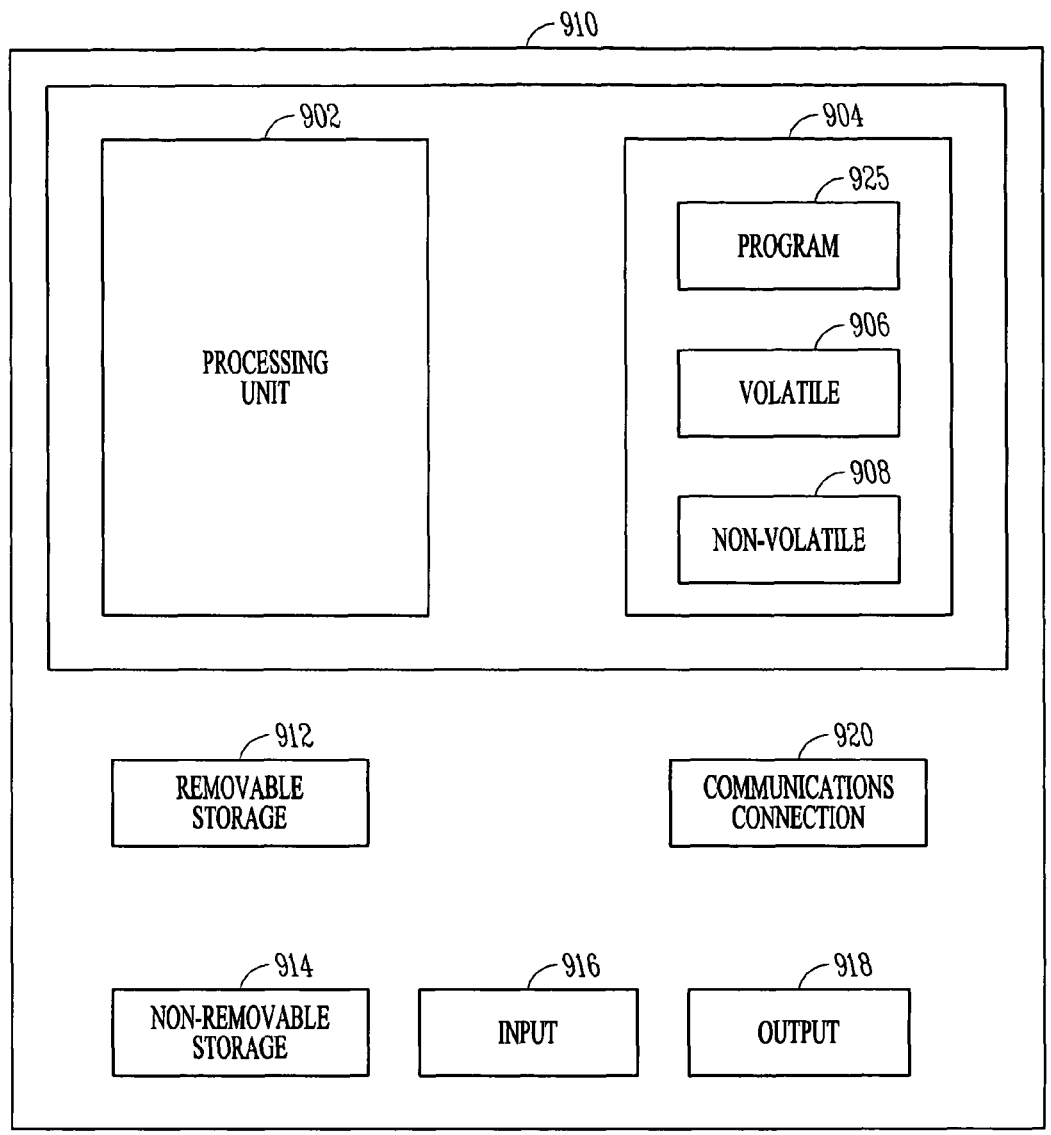
FIG. 9 is a block diagram of a computer system that executes programming for executing code to control procedures performed by operators according to an example embodiment.

A block diagram of a computer system that executes programming for performing the procedures is shown in FIG. 9. A general computing device in the form of a computer 910, may be specifically programmed, and may include a processing unit 902, memory 904, removable storage 912, and non-removable storage 914. Memory 904 may include volatile memory 906 and non-volatile memory 908. Computer 910 may include—or have access to a computing environment that includes—a variety of computer-readable media, such as volatile memory 906 and non-volatile memory 908, removable storage 912 and non-removable storage 914. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 910 may include or have access to a computing environment that includes input 916, output 918, and a communication connection 920. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions to execute methods and algorithms described above may be stored on a computer-readable medium such as illustrated at a program storage device 925 are executable by the processing unit 902 of the computer 910. A hard drive, CD-ROM, and RAM are some examples of articles including a computer-readable medium.

The Abstract is provided to comply with 37 C.F.R. §1.72(b) is submitted with the understanding that it will not be used to interpret or limit the scope or meaning of the claims.

The invention claimed is:

1. A system comprising:
a hands free mobile communication device;
a controller programmed to cause the hands free mobile communication device to communicate audibly with a field operator performing field operations to instruct the operator regarding operations to be performed, receive oral communications from the operator, and to process the received oral communications and provide further instructions responsive to the received oral communications, wherein the controller further automatically recognizes oral commands from the operator and provides further instructions based on the state of a procedure being executed by an automated process control system; and
multiple hands free mobile communication devices coupled to the controller, wherein the controller coordinates multiple field operators via the devices with each other and with a state of an automated control system.

2. The system of claim 1 and further comprising a storage device to store a program for execution by the controller.

3. The system of claim 1 wherein the oral communications are recognized and converted to text commands and wherein the communication device is operable to receive and transmit non-oral input from the operator and switch seamlessly between oral and non-oral input modalities.

4. The system of claim 3 wherein one of the text commands causes recording of audible comments provided by the field operator.

5. The system of claim 4 wherein the text commands further include done, pause, and resume commands operable while audible comments are being recorded.

6. The system of claim 4 wherein the content and procedural context of a comment is analyzed to identify a recipient of an electronic communication including the comment.

7. The system of claim 6 wherein keywords in the comment are used to identify the recipient, and the communication includes a context in which the comment is entered.

8. The system of claim 7 wherein the context includes a name of a procedure being performed by the field operator at the time the comment is provided.

9. The system of claim 4 wherein a comment is analyzed to generate a work order as a function of the content of the comment.

10. The system of claim 1 wherein the audible instructions provided to instruct the operator are synthesized speech generated from the instructions.

11. A method comprising:
providing audible instructions to a field operator via a hands free communication device in accordance with a procedure written in a machine readable form;
receiving oral commands from the hands free mobile communication device as an operator performs the procedure in accordance with the audible instructions;
converting the oral commands to machine readable form to continue executing the procedure interactively via the hands free communication device; and
synchronizing instructions and commands via multiple hands free communication devices and a state of an automated control system such that multiple operators are instructed to perform tasks in the procedure in a manner that is synchronized with the automated control system and with each other operator.

12. The method of claim 11 wherein some tasks are performed in parallel and other tasks are performed only after receiving oral commands indicating that a predetermined task is completed.

13. The method of claim 12 wherein tasks are assigned to specific field operators and to the automated control system.

14. A machine readable device having instructions stored thereon to cause a machine to perform a method comprising:
providing audible instructions to a field operator via a hands free communication device in accordance with a procedure embodied in the instructions;
receiving oral commands from the hands free mobile communication device;
converting the oral commands to machine readable form to coordinate performance of the procedure interactively via the hands free communication device; and
synchronizing instructions and commands via multiple hands free communication devices and a state of an automated control system such that multiple operators are instructed to perform tasks in the procedure in a manner that is synchronized with the automated control system and with each other operator.

15. The machine readable device of claim 14 wherein some tasks are performed in parallel and other tasks are performed only after receiving oral commands indicating that a predetermined task is completed.

16. The machine readable device of claim 14 wherein tasks are assigned to specific field operators.

* * * * *